(12) United States Patent
Hasan et al.

(10) Patent No.: US 11,532,958 B2
(45) Date of Patent: Dec. 20, 2022

(54) PREDICTIVE WIRELESS CHARGING OF ELECTRONIC DEVICES

(71) Applicant: Google LLC, Mountain View, CA (US)

(72) Inventors: Shiblee Hasan, Mountain View, CA (US); Joseph Johnson, Jr., Bremerton, WA (US)

(73) Assignee: Google LLC, Mountain View, CA (US)

( * ) Notice: Subject to any disclaimer, the term of this patent is extended or adjusted under 35 U.S.C. 154(b) by 129 days.

(21) Appl. No.: 17/249,065

(22) Filed: Feb. 18, 2021

(65) Prior Publication Data

US 2022/0294278 A1   Sep. 15, 2022

(51) Int. Cl.
*H02J 50/90*   (2016.01)
*H02J 50/10*   (2016.01)
*G02B 27/01*   (2006.01)

(52) U.S. Cl.
CPC .............. *H02J 50/90* (2016.02); *H02J 50/10* (2016.02); *G02B 27/0172* (2013.01)

(58) Field of Classification Search
CPC ..................................................... H02J 50/90
USPC ......................................................... 320/108
See application file for complete search history.

(56) References Cited

U.S. PATENT DOCUMENTS

| 2017/0147873 A1 | 5/2017 | Kwon |
| 2018/0292901 A1 | 10/2018 | Priyantha et al. |
| 2019/0084434 A1* | 3/2019 | Yoshizaki ............... B60L 53/39 |
| 2021/0184508 A1* | 6/2021 | Lee ......................... H02J 50/90 |

* cited by examiner

*Primary Examiner* — Edward Tso
*Assistant Examiner* — Ahmed H Omar
(74) *Attorney, Agent, or Firm* — Brake Hughes Bellermann LLP

(57) ABSTRACT

Techniques of wireless charging involve a charging base configured to predict when the user is about to charge a device based on a state of the device. For example, the state of the device may be defined by inertial measurement units (IMUs). The charging base then activates in response to predicting that the user intends to charge the device. In some implementations, the prediction is based on a machine learning (ML) engine trained to classify a movement of a device by a user as being about to charge or not being about to charge. If a movement of a device is classified as being about to charge, the charging base activates before the device is detected by the charging base.

20 Claims, 6 Drawing Sheets

300

```
┌─────────────────────────────────────┐
│ Receive an indication that a device │
│ is present and includes a state of  │
│ motion                              │
│                                 302 │
└─────────────────────────────────────┘
                  │
                  ▼
┌─────────────────────────────────────┐
│ Perform a prediction operation to   │
│ produce a classification of the     │
│ device as either (i) about to be    │
│ placed into a position for wireless │
│ charging by the wireless charging   │
│ base, or (ii) not about to be       │
│ placed into a position for wireless │
│ charging by the wireless charging   │
│ base                            304 │
└─────────────────────────────────────┘
                  │
                  ▼
┌─────────────────────────────────────┐
│ In response to the prediction       │
│ operation producing the             │
│ classification of the device as     │
│ about to be placed into a position  │
│ for wireless charging by the        │
│ wireless charging base, activate    │
│ the charging coil prior to the      │
│ device being moved to within the    │
│ threshold distance from the         │
│ wireless charging base          306 │
└─────────────────────────────────────┘
                  │
                  ▼
┌─────────────────────────────────────┐
│ In response to the prediction       │
│ operation producing the             │
│ classification of the device as not │
│ about to be placed into a position  │
│ for wireless charging by the        │
│ wireless charging base, not         │
│ activating the charging coil    308 │
└─────────────────────────────────────┘
```

FIG. 3

PREDICTIVE WIRELESS CHARGING OF ELECTRONIC DEVICES

TECHNICAL FIELD

The details of one or more implementations are set forth in the accompanying drawings and the description below. Other features will be apparent from the description and drawings, and from the claims.

BACKGROUND

Some electronic devices may be charged wirelessly via a charging base. In order to trigger the charging in such electronic devices using the charging base, an electronic device is brought either into contact with the charging base or within some proximity to the charging base. Wireless charging is made possible through the use of resonant inductive couplings within such electronic devices and the charging base.

SUMMARY

In one general aspect, a method can include receiving, by a wireless charging base, an indication that a device is present and is in a state of motion; in response to the indication that the device is present, performing a prediction operation based on the state of motion of the device to produce a classification of the device as either (i) about to be placed into a position for wireless charging by the wireless charging base, or (ii) not about to be placed into a position for wireless charging by the wireless charging base; in response to the classification of the device as being about to be placed into a position for wireless charging by the wireless charging base, activating the charging coil prior to the device being placed within a charging range of the wireless charging base to charge the device; and in response to the prediction operation producing the classification of the device as being not about to be placed into a position for wireless charging by the wireless charging base, not activating the charging coil.

The details of one or more implementations are set forth in the accompanying drawings and the description below. Other features will be apparent from the description and drawings, and from the claims.

BRIEF DESCRIPTION OF THE DRAWINGS

FIG. 3 is a flow chart that illustrates an example method of performing the improved techniques within the electronic environment shown in FIG. 1.

DETAILED DESCRIPTION

Figure 1A:
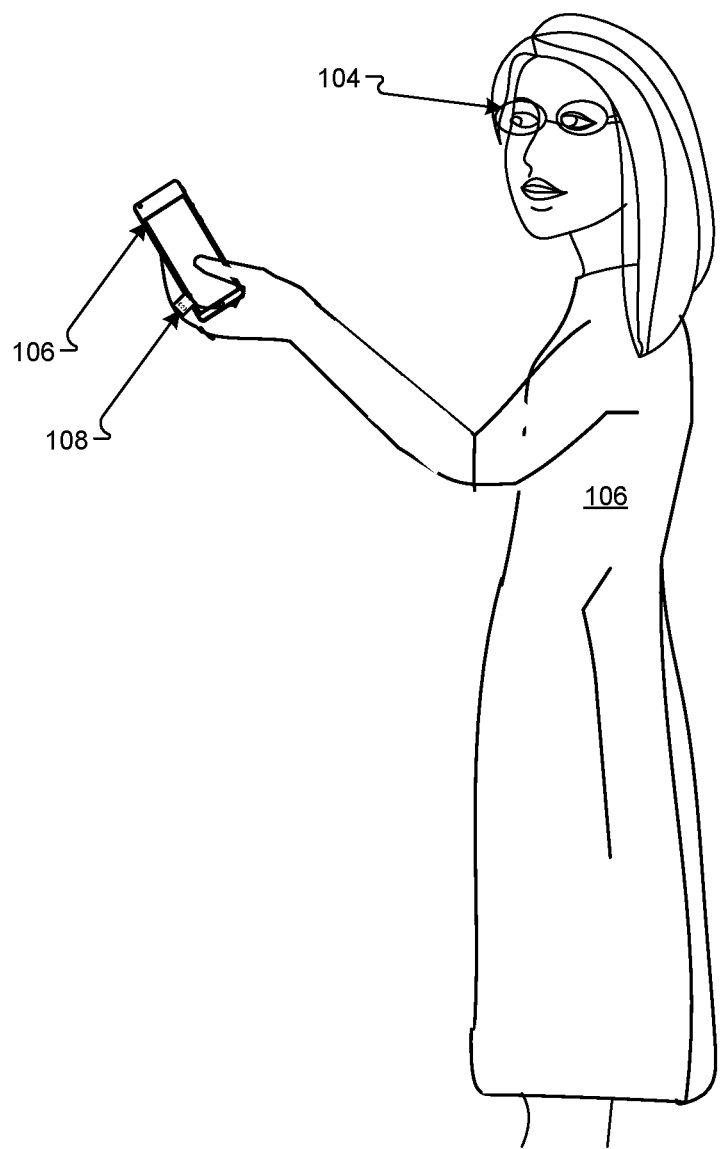
FIG. 1A is a diagram that illustrates a user with a wearable device holding a mobile device containing a wireless charging base.

Some electronic devices are wearable by a user on their body (e.g., a wrist or a hand). For example, a user may wear a wearable augmented reality (AR) ring on their finger that is configured to provide input to AR glasses for an augmented reality experience. Such wearable devices may have relatively small batteries and may require frequent charging. As described herein such wearable devices may be charged using a wireless charging base embedded in, for example, a companion device that can be held by a user such as a mobile phone. As a specific example, the wearable AR ring worn by the user can be charged by a charging apparatus within the mobile phone when the user holds the mobile phone with the same hand that the wearable AR ring is worn on.

In situations like those described above in which a wearable device may need to be charged frequently because of a small battery, the latency of the charging base in providing charge to the wearable device may become problematic. The time needed for the charging base to activate to the point where it is providing the necessary power may interfere with the user experience. For example, the charging base may be activated by bringing the wearable device into contact with the charging base or with the mobile device in which the charging base is embedded. In some implementations, the charging base may be activated by bringing the wearable device to within some threshold distance from the charging base within a mobile device. In this case, the charging base is not activated until the contact or presence within the threshold distance is detected via, for example, near field communication (NFC).

The concepts described herein are further advantageous over conventional wireless charging using a charging base. A charging base, which may be plugged into the wall or be operating on its own battery power, has a transmitter coil and an electronic device to be wirelessly charged has a receiver coil. The charging base regularly sends a signal out, and when a receiver coil gets close enough, a resonance charge occurs in the signal. The waveform of the signal is then modulated and inductive, i.e., wireless charging begins. Inductive charging uses the two coils to create a magnetic field between the electronic device and the charging base. In creating this magnetic field, excess heat may also be created. Because of the excess heat created, wireless charging via the charging base may require more time to charge the electronic device than plugging the device into the wall directly.

Conventional wireless charging begins when a device is detected to be in contact with a charging base. Because wireless charging uses a large amount of power (e.g., about 10 Wh-about 30 Wh, although in some implementations the amount of power used depends on how much the receiving device is capable of receiving charge), a charging base will not have activated its transmitter coil until the device is in contact with the charging base. Accordingly, there may be a lag in charging the device using the charging base. In a situation in which the device charges frequently because of, e.g., a small battery, the subsequent lags in charging can accumulate into a significant burden for a user of the device.

The improved techniques described herein involve a charging base configured to predict when the user is about to charge a wearable device based on a state of the device. For example, the state of the wearable device may be defined by inertial measurement units (IMUs). The charging base then activates in response to predicting that the user intends to charge the wearable device before the user brings the wearable device within a charging range of the charging base. In some implementations, the prediction is based on a machine learning (ML) engine trained to classify a movement of a wearable device by a user as being about to charge or not being about to charge. If a movement of a wearable device is classified as being about to charge, the charging base activates before the wearable device is detected by the charging base. This is an improvement over the above-described conventional wireless charging techniques in which lags in charging a device can accumulate into a significant burden for a user of the device.

As a specific example, a user can wear a wearable AR ring on their finger and keep a mobile phone with an embedded charging base in their pocket or in a purse. When the user wishes to charge the wearable AR ring, the user may reach into their pants pocket and grasp the mobile phone with the same hand on which the wearable AR ring is worn. In this case, the charging circuitry in the mobile phone can detect the presence of the wearable AR ring away from the mobile phone using, e.g., a soli radar. The charging circuitry may then generate a prediction of whether the user is about to charge the wearable AR ring based on a ML engine that classifies a state of motion of the wearable AR ring as either being about to charge or not about to charge. When the state of motion is classified as being about to charge, the charging circuitry activates the charging base embedded in the mobile phone before the wearable AR ring comes into contact with the mobile phone. In this way, the charging latency has been reduced or eliminated and the wearable AR ring starts charging more quickly.

Advantageously, the improved techniques suffer no (or very little) lag in charging wearable devices because the charging base activates early. The wearable devices can be fully ready to charge by the time the wearable device is in chargeable range of or in contact with the charging base.

FIG. 1A is a diagram that illustrates a user with a wearable device holding a companion device (e.g., mobile device) including a wireless charging base. As shown in FIG. 1A, a user 106 is participating in an augmented reality experience using a pair of AR glasses 104 controlled by circuitry in a mobile phone 106 and a wearable AR ring 108. As also shown in FIG. 1A, the user 106 is charging the wearable AR ring 108 by holding the mobile phone 108 in the hand on which the wearable AR ring 108 is worn.

Note that the wearable AR ring 108 may send signals to the AR glasses 106 which in turn is wirelessly connected to the mobile phone 106. Prior to the charging shown in FIG. 1A, signals including information including IMU data indicating position, orientation, and/or velocity of the wearable AR ring 108 can be sent to the mobile phone 106. Charging circuitry in the mobile device 106 can receive and process the IMU data and can determine (e.g., predict) whether the user is about to charge the wearable AR ring 108 based on the IMU data.

Although FIG. 1A shows a wearable AR ring on a user, other wearable devices can be used in the above-described scenarios. For example, in some implementations, the wearable AR device can take the form of a wearable AR watch, a wearable AR wristband, or the like.

Figure 1B:
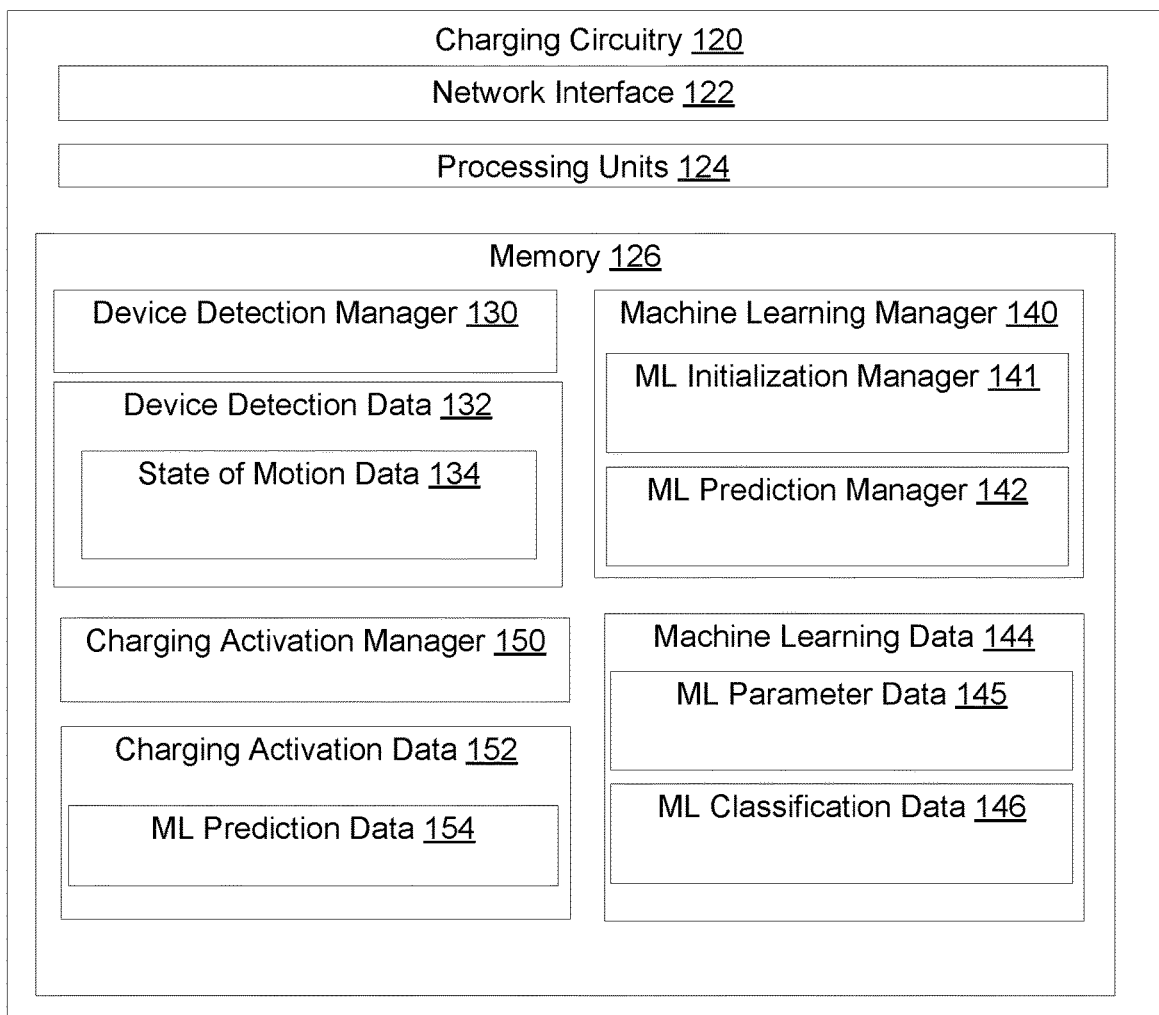
FIG. 1B is a diagram that illustrates an example electronic environment associated with the wireless charging base for implementing improved techniques described herein.

FIG. 1B is a diagram that illustrates an example electronic environment associated with a wireless charging base in which the above-described improved techniques may be implemented. As shown, in FIG. 1B, the example electronic environment includes charging circuitry 120. In some implementations, the charging circuitry is embedded in a mobile phone such as the mobile phone 106 of FIG. 1A.

The charging circuitry 120 is configured to determine conditions under which the associated wireless charging base may be activated to charge a device. The charging circuitry 120 includes a network interface 122, one or more processing units 124, and memory 126. The network interface 122 includes, for example, Ethernet adaptors and the like for converting electronic and/or optical signals received from a network to electronic form for use by the charging circuitry 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the charging circuitry 120 can be, or can include processors (e.g., processing units 124) configured to process instructions stored in the memory 126. Examples of such instructions as depicted in FIG. 1 include a device detection manager 130, a machine learning manager 140, and a charging activation manager 150. Further, as illustrated in FIG. 1, the memory 126 is configured to store various data, which is described with respect to the respective managers that use such data.

The device detection manager 130 is configured to perform a device detection operation to indicate whether a device is present. In some implementations, the device detection manager 130 is configured to determine a state of motion of the detected device. For example, FIG. 2B illustrates a mobile device 220 containing a charging base 222. Circuitry in the mobile device 220 may be configured to detect the presence of a device such as a wearable device, e.g., wearable AR ring, 230 illustrated in FIG. 2C. In some implementations, the circuitry in the mobile device 220 may also be configured to determine a state of motion of the wearable device 230. In some implementations, the mobile device 220 may detect the presence of a device such as wearable device 230 when the wearable device 230 is within a range of an object tracking system embedded within the charging base 222. Such an object tracking system may also detect an angle of approach and/or a velocity of the device. In some implementations, the object tracking system includes a radar (e.g., a soli radar chip). In some implementations, the range of the radar is between about 0.1 m and about 10 m, within a hemisphere bounded by the surface of the charging base 222.

The device detection manager 130 is configured to produce device detection data 132 from the above-described device detection operation. The device detection data 132 in some implementations takes the form of an indicator, indicating whether the device is present. In some implementations, the device detection data 132 includes state of motion data 134.

The state of motion data 134 represents the movement of the device by a user over a period of time. For the example of the wearable device 230 in FIG. 2C, the user may have the wearable device 230 in a pocket on their jacket or pants; the state of motion of the wearable device 230 may take the form of a path from the pocket to a current location. In some implementations, the state of motion data 134 takes the form of a time series of coordinates, sampled at a specified period of time, e.g., about 10-about 100 msec based on a sample rate of about 10 Hz to about 100 Hz. In some implementations, the sample rate is increased if there is a determination that the user is very likely to reach out to the phone; in this case, a prediction determines a point in time (e.g., forward prediction) at which a wearable AR device (e.g., a smartring) will touch the phone so that charging is activated and subtracts from the an amount of time it takes for the charger to activate.

In some implementations, the state of motion data 134 represents nine axes, or components, of an inertial measurement unit (IMU). In representing an IMU, the state of motion data 134 has three compass coordinates representing a position of the device in three-dimensional space; three gyroscopic coordinates representing an orientation of the device expressed in, e.g., direction cosines, Euler angles, or the like; and three accelerometer coordinates representing a velocity of the device. In some implementations, each of the nine coordinates of the state of motion data 134 representing an IMU is sampled at a specified time period to form a time series.

Figure 2A:
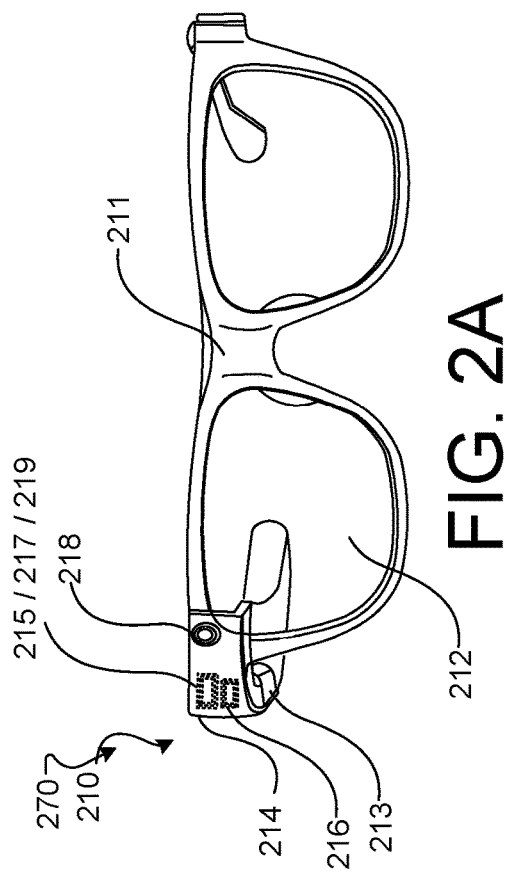
FIG. 2A is a diagram that illustrates an example AR glasses according to the improved techniques described herein.
Figure 2B:
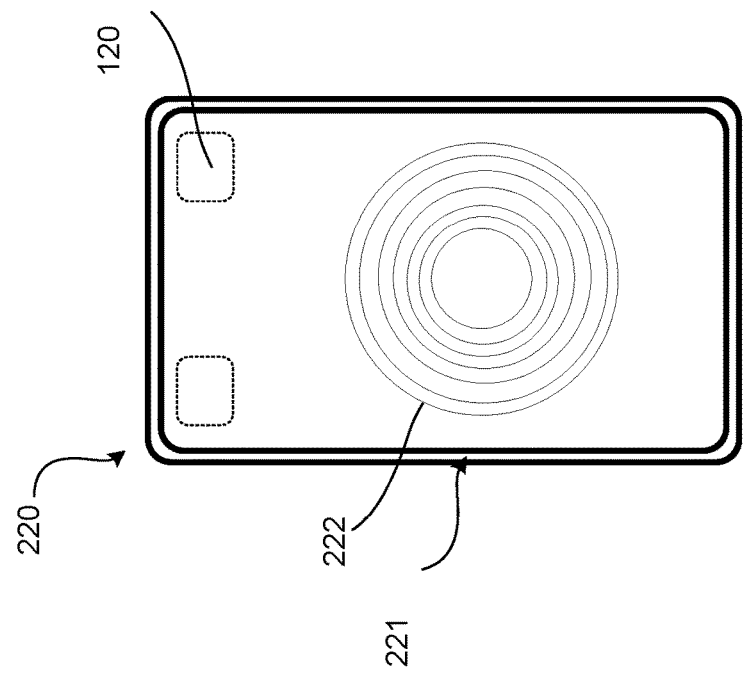
FIG. 2B is a diagram that illustrates an example mobile phone that contains a wireless charging base according to the improved techniques described herein.
Figure 2C:
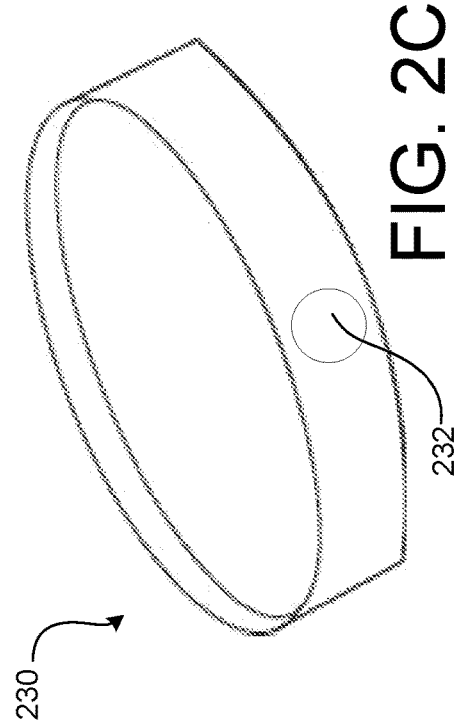
FIG. 2C is a diagram that illustrates an example wearable AR ring according to the improved techniques described herein.

In some implementations in which the device is or includes the wearable device 230 from FIG. 2C, the state of motion data 134 can represent a motion of a user's finger on which the wearable device 230 is worn, the user's hand, or the user's arm.

The device detection data 132 indicates the presence of a device for the charging circuitry 120, wherein the charging circuitry 120 may be embedded in a mobile device such as mobile device 220 of FIG. 2B. When the device detection data 132 indicates such a presence, the computer 120 may begin measuring or detecting a state of motion of the detected device. After a time interval, the state of motion data 134 takes the form of a time series of positions, orientations, and/or velocities. The charging circuitry 120 is then configured to predict whether the user is about to charge the device with a charging base, i.e., wireless charging base 222. If the prediction indicates that the user is about to charge the device using the charging base, then the charging circuitry 120 activates the charging base to begin wireless charging before the device is brought within a charging range of, e.g., in contact or within a specified range of, the charging base. In this way, the charging base will be fully ready to charge the device once the device is within a charging range of the charging base.

The machine learning manager 140 is configured to perform a prediction operation based on the device detection data 132, including the state of motion data 134, to produce ML data 144. In some implementations, the machine learning manager 140 includes a machine learning initialization manager 141 and a machine learning prediction manager 142.

ML algorithms may be used to predict a state of motion of a device or a user wearing a device and analyze resulting gestures in order to predict whether the device is about to be charged in order to start receiving charge at full power, while not receiving charge for devices that are detected but are not about to be charged, e.g., a device itself being dropped. In some implementations, an ML algorithm used to determine whether a device is about to be charged takes the form of a classifier that sorts times series of, e.g., IMU axes into time series that indicate a device is about to be charged and those that indicate a device not about to be charged.

The machine learning (ML) initialization manager 141 is configured to train (initialize) a machine learning engine to make predictions about whether a user is about to charge a device using a charging base. In some implementations, a machine learning algorithm used by the ML manager 140 includes dynamic time-warp, which compares times series of states of motion. In some implementations, a machine learning algorithm used by the ML manager 140 includes You Only Look Once (YOLO), which performs real-time object tracking. In some implementations, the ML initialization manager 141 includes a Kalman filter.

The ML training uses a cost function or a combination of cost functions to determine values of parameters that define the ML engine. For example, in some implementations, a cost function may be defined to maximize an amount of charging time in which the charging base is providing power to the device. In such an implementation, the cost function may be configured to maximize the amount of power provided by the charging base at any point in time. In some implementations, the cost function may be configured to minimize the amount of charging time in which the charging base provides power when the device is not within charging range, as such power is wasted.

The ML initialization manager 141 is configured to train or tune parameters, e.g., ML parameter data 145, of the ML engine according to various metrics acting in trade-off, e.g., proactively minimizing charge provided before the device is placed within a charging range is made against maximizing charge contact time or minimizing time to start charging latency. In some implementations, the ML initialization manager 141 is also configured to maximize charge power level against sensitivity of sensors such as, e.g., *soli* radar for detecting motion of objects. In some implementations, the ML initialization manager is further configured to minimize power drain on the phone. The training of the ML engine may result in the production of ML classification data 146.

The ML initialization manager 141, in some implementations, is configured to calibrate the ML engine using an enrollment process. For example, in such an enrollment process a user provides a known reference point e.g. hold arm out or perform a task such as picking up the charging base. Other deliberate gestures may be used to aid in calibration such as laying a hand flat on the table and then tapping a ring finger—on which a wearable AR ring, e.g., wearable AR ring 230 is worn—so that an amount of variation that the sensors produce may be measured when the ring finger is still and when the ring finger is in motion.

The ML prediction manager 142 is configured to classify whether a device is about to be charged based on device detection data 132 including state of motion data 134. For example, the ML engine, i.e., the ML prediction manager 142, may classify, based on the ML parameter data 145 determined by the ML initialization manager 141, whether a movement of a device from a pants pocket outward toward the charging base as being about to charge, while the ML engine may also classify a dropping of the device onto a floor as bring not about to charge. Such classifications may be performed based on ML classification data 146.

In some implementations, the ML classification data 146 represents time series data that is labeled as either "about to be charged" or "not about to be charged." In such an implementation, the ML engine, upon obtaining time series data from the state of motion data 134, performs a best fit of the time series data to time series labeled in the ML classification data 146; the best fit time series would then provide the classification of the state of motion. In some implementations, the classification or a forward prediction is performed using a Dynamic Time Warping algorithm. In some implementations, the classification is performed using a Kalman filter. In some implementations, the classification is performed using a convolutional neural network (CNN). In some implementations, the classification is performed using a long short term memory (LSTM) as an example of a recursive neural network (RNN). In some implementations, the classification is performed using a The charging activation manager 150 is configured to activate the wireless base in response to receiving an indication from the ML manager 140 that the device has a state of motion classified as being about to be charged. This activation is done prior to the device being within a charging range of the charging base so that, by the time the device is within a charging range of the charging base, the device is being charged at a high power and quickly. The charging activation manager 150 is further configured to produce, in some implementations, charging activation data 152 based on ML prediction data 154.

The ML prediction data 154 represents the results of the classification performed by the ML engine on the state of motion time series of the device. In response to a classification of a state of motion as being about to be charged, the charging activation manager 150 receives a signal indicating a trigger to activate the charging base for providing power. In response to a classification of a state of motion as being not about to be charged, the charging activation manager 150 receives a signal indicating a trigger to either do nothing when the charging base is not activated or, in some implementations, deactivate the charging base when the charging base is activated.

In some implementations, the ML initialization manager 141 may be adaptive or personalized for different users. In some implementations, the ML initialization manager 141 is more or less aggressive with some parameters to minimize power drain on the phone while maximizing power delivered to the device as measured by the amount of residual power left in the device at various points in the day, e.g. start vs end of day, or each hour, etc.

Figure 1C:
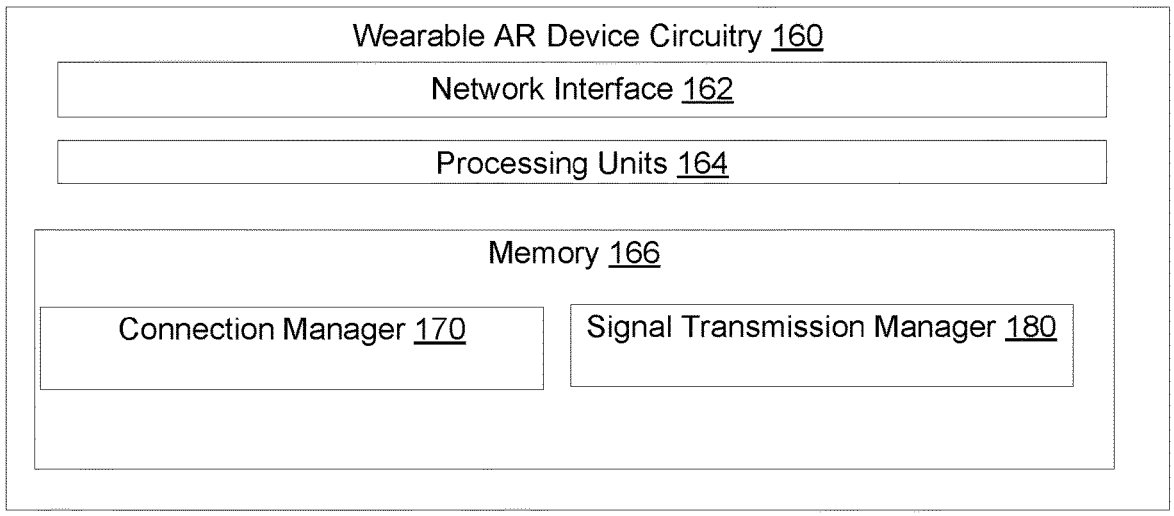
FIG. 1C is a diagram that illustrates an example electronic environment associated with the wearable AR device for implementing improved techniques described herein.

FIG. 1C is a diagram that illustrates an example electronic environment associated with a wearable AR device in which the above-described improved techniques may be implemented, including wearable AR circuitry 160. In some implementations, the wearable AR device takes the form of a ring worn on a finger. In some implementations, the wearable AR device takes the form of a watch or other wristband.

The wearable AR circuitry 160 is configured to transmit signals that may provide IMU data to charging circuitry to determine whether to activate a charger or not. The wearable AR circuitry 160 includes a network interface 162, one or more processing units 164, and memory 166. The network interface 162 includes, for example, circuitry for converting electronic and/or optical signals received from a network to electronic form for use by the wearable AR circuitry 160. The set of processing units 164 include one or more processing chips and/or assemblies. The memory 166 includes both volatile memory (e.g., RAM) and non-volatile memory, such as one or more ROMs, disk drives, solid state drives, and the like.

In some embodiments, one or more of the components of the wearable AR circuitry 160 can be, or can include processors (e.g., processing units 164) configured to process instructions stored in the memory 166. Examples of such instructions as depicted in FIG. 1 include a connection manager 170 and a signal transmission manager 180.

The connection manager 170 is configured to establish and maintain a network connection with the charging circuitry 120. In some implementations, the connection manager 170 is configured to establish the network connection to the charging circuitry 120 via AR glasses, e.g., AR glasses 210 of FIG. 2A. In some implementations, the connection includes a Bluetooth® signal.

The signal transmission manager 180 is configured to generate and transmit heartbeat signals over the connection established by the connection manager 170. The signal transmission manager 180, in some implementations, is configured to transmit the heartbeat signals at instants of time from which the charging circuitry 120 may determine IMU data from which the wireless charging base may or may not be activated.

FIGS. 2A, 2B, and 2C are diagrams that illustrate various elements of a AR glasses system 270 that may be used in an augmented reality (AR) situation.

FIG. 2A is a diagram that illustrates an example AR glasses 210. The AR glasses 210 may be used as a head-mounted display (HMD) within an AR system. The AR glasses 210 include a frame 211, with a display device 212 coupled in the frame 211. In some implementations, an audio output device 213 is coupled to the frame 211. In some implementations, a touch surface 214 allows for user control, input and the like of the HMD 210. The HMD 210 may include a sensing system 216 including various sensing system devices and a control system 217 including various control system devices to facilitate operation of the HMD 210. The control system 217 may include a processor 219 operably coupled to the components of the control system 217 and a communication module 215 providing for communication with external devices and/or networks. The HMD 210 may also include an image sensor 218 (i.e., a camera 218), a depth sensor, a light sensor, and other such sensing devices. In some implementations, the image sensor 218, or camera 218 is capable of capturing still and/or moving images, patterns, features, light and the like.

FIG. 2B is a diagram that illustrates an example mobile phone 220 that contains a wireless charging base 222. The wireless charging base 222 is shown as a transmitting coil contained in the mobile phone 220. Moreover, the mobile phone 220 further includes an interface device 221. In some implementations, the interface device 121 functions as an output device, including, for example, a display area that can output information to the user. In some implementations, the interface device 221 functions as an input device, including, for example, a touch surface, allowing the interface device 221 to receive touch inputs from the user. In some implementations, the interface device 221 functions as an input device and an output device. The mobile phone 220 may include a sensing system including various sensing system devices. The mobile phone 220 also includes the charging circuitry 120 (FIG. 1B) used to detect the presence of the wearable device 230 and activate the charging base prior to the wearable device 230 being brought within a charging range of the mobile phone 220 based on the state of motion of the wearable device 230. The mobile phone 220 may also include an image sensor (i.e., a camera), a depth sensor, a light sensor, and other such sensing devices. In some implementations, the image sensor, or camera is capable of capturing still and/or moving images, patterns, features, light and the like.

FIG. 2C is a diagram that illustrates an example wearable device 230, such as, e.g., a wearable AR ring worn on a finger. As shown in FIG. 2C, the wearable device 230 includes a transmitter 232 configured to transmit signals containing, e.g., heartbeat data transmitted by the wearable device 230 to be received by the sensing system of the mobile phone 220. In some implementations, the heartbeat data enables the mobile phone 220 to generate IMU data based on, e.g., amplitude and timing of the received signal. In some implementations, the signals may be received by the sensing system 216 of the AR glasses 210. It is noted that the wearable device 230 may remain on the finger of a user while it is charging using the wireless charging base 222.

In some implementations, the wearable AR ring transmitter 232 sends signals to the sensing system of the mobile phone 220. Based on these signals, the processor 229 of the mobile phone 220 generates IMU data of the wearable device 230 to form the time series needed to classify the state of motion as being about to be charged or not being about to charge.

In some implementations, the wearable AR ring transmitter 232 sends signals to the sensing system 216 of the AR glasses 210. In such an implementation, the communication module 215 of the AR glasses 210 would receive the signals and generate the IMU data. The communication module 215 would then send the IMU data to the mobile phone for classification. In some implementations, the IMU data is transmitted between all the devices (e.g., wearable device 230, glasses 210, and mobile phone 220). The order in which the IMU data is transmitted depends, in some implementations, on which device requires processing at any point in time.

Some smartphones have multiple charging modes and in some implementations, the ML initialization manager 141 may take such modes into account when optimizing the cost functions and determining the parameters of the ML engine. For example, certain smartphones have a fast charging mode and a slow or trickle charging mode; these modes are useful in different situations. Such charging modes may be useful in maximizing power during a charge and minimizing power when a device is predicted to not about to be charged.

In some implementations, when the wearable device 230 is transmitting to the AR glasses 210, additional input beside the IMU data from the wearable device 230 may be taken into account. For example, the direction of the user's gaze while wearing the AR glasses 210 may be taken into account by the ML initialization manager 141. Additionally, certain gestures made by the user, e.g., using a hand, an arm, a torso, or a head, may also provide more data from which the ML initialization manager determines the parameters of the ML engine.

In some implementations, the sensing system of the mobile phone 220 uses, as an additional parameter to determine forward prediction, biophysical data generated by the user. For example, a user with a higher heart rate after receiving a notification may be more likely to reach out to grab the phone. Alternatively, the user could be performing some high intensity task that would make their movements less accurate to predict, e.g. an elevated heart rate might tell us that the person is actually exercising, and in this case maybe we need to raise the frequency of the sample rate. Some high intensity activities may be easier to predict than others, e.g. jogging may result in predictable forward movement and side to side motion of the arms in a predictable way, particularly if a history of the user's movements is recorded over time on these activities.

Figure 2D:
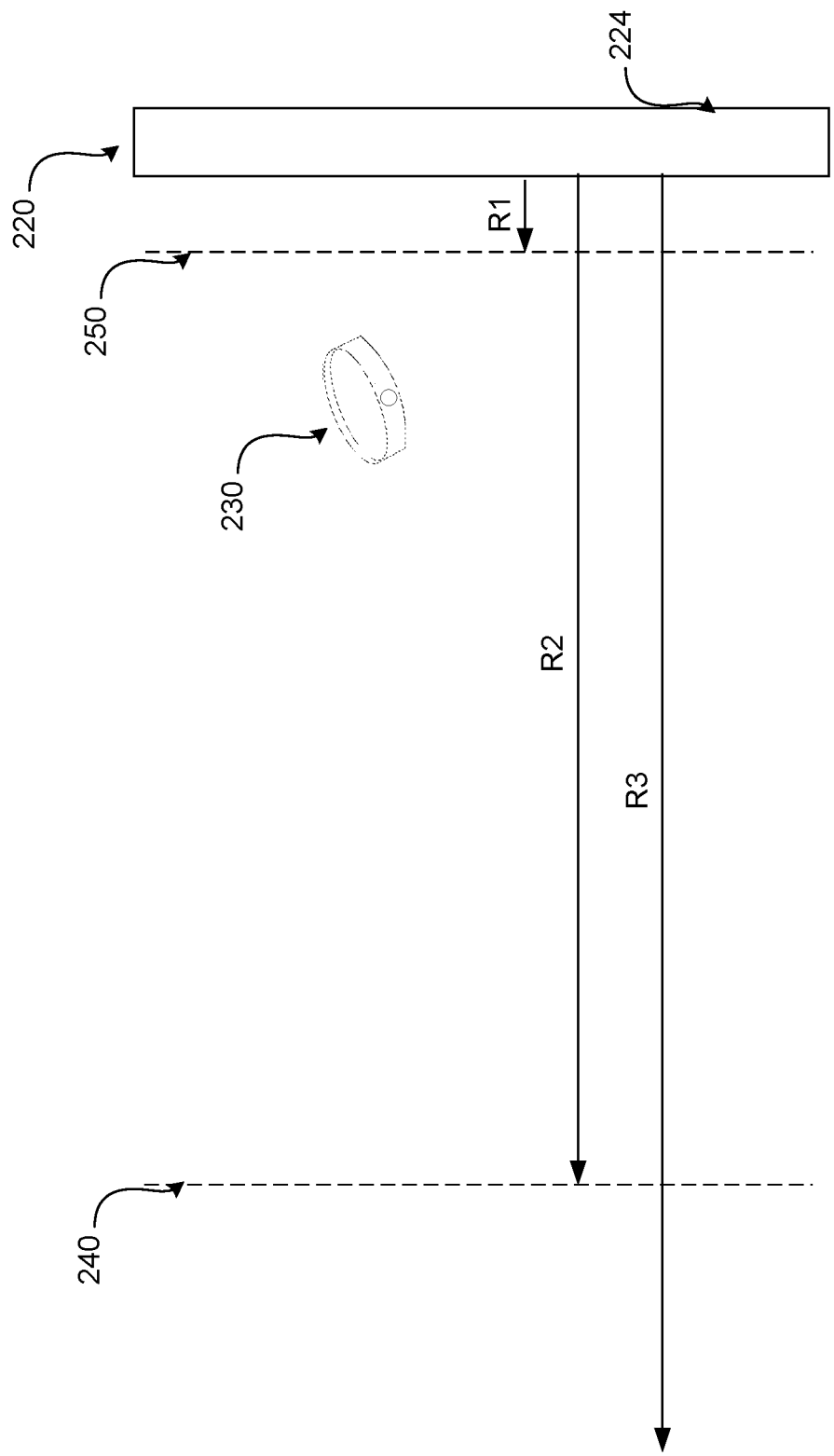
FIG. 2D is a diagram that illustrates example relative spatial positions between a wearable AR ring and a mobile phone that contains a wireless charging base according to the improved techniques described herein.

FIG. 2D is a diagram that illustrates example relative spatial positions between a wearable AR ring (e.g., wearable AR ring 230 of FIG. 2C) and a mobile phone that contains a wireless charging base (e.g., mobile phone 220 with charging base 222). FIG. 2D shows planes 240 and 250 that represent threshold distances R2 and R1, respectively, from the mobile phone 220.

Plane 240 represents the range R2 of a radar used in an object tracking system embedded in charging circuitry (e.g., device detection manager 130 of the charging circuitry 120 in FIG. 1B). For positions of the wearable AR ring 230 beyond the plane 240 relative to the mobile phone 220, there will be no indication that the wearable AR ring 230 is present and the charging circuitry will not track the wearable AR ring 230. For positions of the wearable AR ring 230 between the plane 240 and the mobile phone 220, there will be an indication that the wearable AR ring 230 is present and the charging circuitry will track the wearable AR ring 230 to determine a state of motion and ultimately classify the wearable AR ring 230 as being about to be charged or not about to be charged based on the state of motion.

It is noted that, in some implementations, plane 240 is replaced with the surface of a sphere.

Plane 250 represents positions relative to a surface 224 of the mobile phone 220 inside of which the wearable AR device 230 is within a charging range of the surface 224 of the mobile phone 220; when the wearable AR device 230 is within a charging range of the surface 224 of the mobile phone 220, the charging base 222 embedded in the mobile phone 220 may charge the wearable AR device 230. In some implementations, the plane 250 is coincident with the surface 224 of the mobile phone 220. In some implementations, the plane 250 is a small distance R1 from the surface 224; such a small distance may be defined by a near field communication (NFC) device in the charging circuitry 222. In some implementations, plane 250 is replaced with the surface of a sphere.

FIG. 2D also shows a third range, R3, greater than R2 and R1, at which a device is not considered present and from which no IMU data may be generated.

FIG. 3 is a flow chart that illustrates an example method 300 of performing wireless charging. The method 300 may be performed by software constructs described in connection with FIG. 1, which reside in memory 126 of the charging circuitry 120 and are run by the set of processing units 124.

At 302, the device detection manager 130 receives, by a wireless charging base (e.g., wireless charging base 222), an indication that a device (e.g., wearable device 230) is present and is in a state of motion (e.g., represented by state of motion data 134). For example, the wearable device 230 may broadcast its presence via transmitter 232 to the mobile phone 220 via smart AR glasses 210; in response, the mobile phone 220 via the charging circuitry 120 may generate IMU data in the form of time series from the broadcast.

At 304, in response to the indication that the device is present, the ML prediction manager 142 performs a prediction operation based on the state of motion of the device to produce a classification of the device as either (i) about to be placed into a position for wireless charging by the wireless charging base, or (ii) not about to be placed into a position for wireless charging by the wireless charging base.

At 306, in response to the classification of the device as being about to be placed into a position for wireless charging by the wireless charging base, the charging activation manager 150 activates the charging coil prior to the device placed within a charging range of the wireless charging base to charge the device. Charging range can indicate either the device being in direct contact with a surface of the wireless charging base (e.g., surface 224) or the device being within a short distance away (e.g., inside plane 250 at a distance R1) from the surface of the wireless charging base (e.g., surface 224).

At 308, in response to the prediction operation producing the classification of the device as being not about to be placed into a position for wireless charging by the wireless charging base, the charging activation manager 150 does not activating the charging coil. In some implementations, the charging activation manager 150 deactivates an activated charging coil.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the charging circuitry 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the charging circuitry 120.

The components (e.g., managers, processing units 124) of the charging circuitry 120 can be configured to operate based on one or more platforms (e.g., one or more similar or different platforms) that can include one or more types of hardware, software, firmware, operating systems, runtime libraries, and/or so forth.

The components of the charging circuitry 120 can be, or can include, any type of hardware and/or software configured to process attributes. In some implementations, one or more portions of the components shown in the components of the charging circuitry 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the charging circuitry 120 can be, or can include, a software module configured for execution by at least one processor (not shown). In some implementations, the functionality of the components can be included in different modules and/or different components than those shown in FIG. 1.

In some implementations, the components of the charging circuitry 120 (or portions thereof) can be configured to operate within a network. Thus, the components of the charging circuitry 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the charging circuitry 120 can be, or can include, processors configured to process instructions stored in a memory. For example, the device detection manager manager 130 (and/or a portion thereof), the machine learning manager 140 (and/or a portion thereof), and the charging activation manager 150 (and/or a portion thereof) can include a combination of a memory storing instructions related to a process to implement one or more functions and a configured to execute the instructions.

Figure 4:
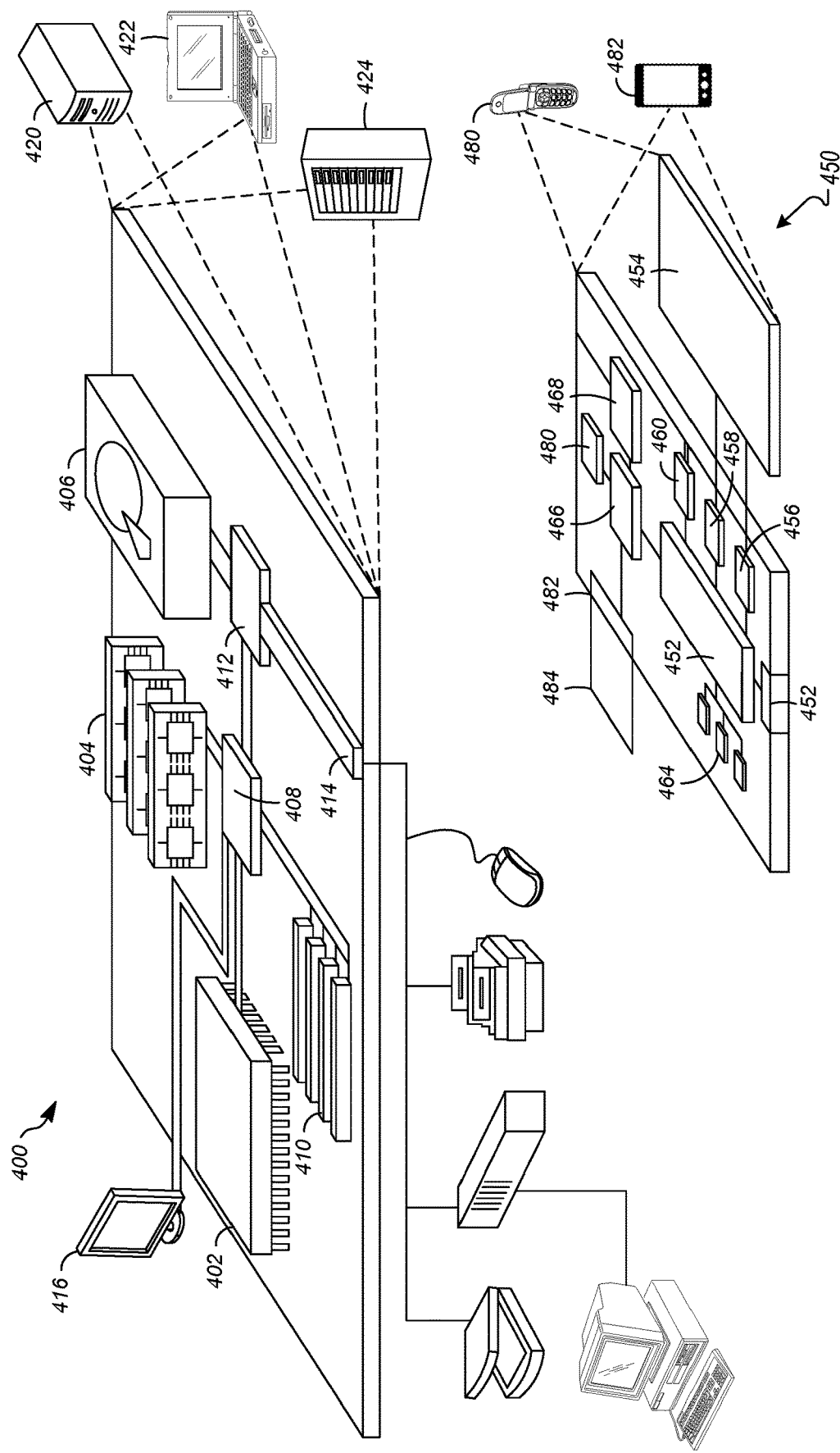
FIG. 4 illustrates an example of a computer device and a mobile computer device that can be used with circuits described here.

FIG. 4 shows an example of a generic computer device 400 and a generic mobile computer device 450, which may be used with the techniques described here. Computing device 400 is intended to represent various forms of digital computers, such as laptops, desktops, tablets, workstations, personal digital assistants, televisions, servers, blade servers, mainframes, and other appropriate computing devices. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The processor 402 can be a semiconductor-based processor. The memory 404 can be a semiconductor-based memory. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method, comprising:
   receiving, by a wireless charging base, an indication that a device is present and is in a state of motion;
   in response to the indication that the device is present, performing a prediction operation based on the state of motion of the device to produce a classification of the device as either (i) about to be placed into a position for wireless charging by the wireless charging base, or (ii) not about to be placed into a position for wireless charging by the wireless charging base;
   in response to the classification of the device as being about to be placed into a position for wireless charging by the wireless charging base, activating the charging coil prior to the device being placed within a charging range of the wireless charging base to charge the device; and
   in response to the prediction operation producing the classification of the device as being not about to be placed into a position for wireless charging by the wireless charging base, not activating the charging coil.

2. The method as in claim 1, wherein the indication that the device is present is an indication that the device is within a range of an object tracking system embedded within the wireless charging base.

3. The method as in claim 1, wherein the device being placed within the charging range of the wireless charging base includes the device being placed into direct contact with a surface of the wireless charging base.

4. The method as in claim 1, where in the state of motion of the device includes at least one of i) a position of the device with respect to the wireless charging base, ii) an orientation of the device with respect to a coordinate system, or iii) a velocity with respect to the wireless charging base.

5. The method as in claim 1, wherein performing the prediction operation includes:
   generating a time series of the state of motion of the device; and
   using a machine learning engine to classify the time series as indicating the device as either (i) about to be placed into a position for wireless charging by the wireless charging base, or (ii) not about to be placed into a position for wireless charging by the wireless charging.

6. The method as in claim 5, wherein the machine learning engine includes a dynamic time-warp algorithm which classifies the time series of the state of motion of the device as either (i) about to be placed into a position for wireless charging by the wireless charging base, or (ii) not about to be placed into a position for wireless charging by the wireless charging.

7. The method as in claim 5, wherein the machine learning engine includes a you only look once (YOLO) algorithm which tracks the state of motion of the device in real time.

8. The method as in claim 5, wherein the machine learning engine is configured to increase a charging time from the wireless charging base to the device in response to the device being placed in the position for wireless charging by the wireless charging base.

9. The method as in claim 5, wherein the machine learning engine is configured to decrease a charging power from the smartphone in response to the device not being placed in the position for wireless charging by the wireless charging base.

10. The method as in claim 5, wherein the machine learning engine is configured to increase a charging time from the wireless charging base to the device in response to the device being placed in the position for wireless charging by the wireless charging base.

11. The method as in claim 1, wherein the wireless charging base is embedded within a smartphone.

12. The method as in claim 11, wherein the device is a wearable AR ring disposed around a finger of a user, the wearable AR ring being configured to broadcast its state of motion to a pair of AR glasses disposed on a face of the user, the AR glasses being configured to communicate the state of motion of the wearable AR ring to the smartphone.

13. The method as in claim 12, wherein the classification of the wearable AR ring as either (i) about to be placed into a position for wireless charging by the smartphone, or (ii) not about to be placed into a position for wireless charging by the smartphone, is based on a position, orientation, and/or velocity of the wearable AR ring with respect to the AR glasses.

14. The method as in claim 11, wherein the indication that the device is present is an indication that the device is within a range of an object tracking system embedded in circuitry within the smartphone.

15. The method as in claim 1, wherein the prediction operation produces a first classification of the device in response to a state of motion for a first user and a second classification of the device in response to the state of motion for a second user.

16. A computer program product comprising a nontransitive storage medium, the computer program product including code that, when executed by processing circuitry of a wireless charging base having a charging coil configured to charge devices when the devices are within a threshold distance from the wireless charging base, causes the processing circuitry to perform a method, the method comprising:
  receiving an indication that a device is present and is in a state of motion;
  in response to the indication that the device is present, performing a prediction operation based on the state of motion of the device to produce a classification of the device as either (i) about to be placed into a position for wireless charging by the wireless charging base, or (ii) not about to be placed into a position for wireless charging by the wireless charging base;
  in response to the classification of the device as being about to be placed into a position for wireless charging by the wireless charging base, activating the charging coil prior to the device being placed within a charging range of the wireless charging base to charge the device; and
  in response to the prediction operation producing the classification of the device as being not about to be placed into a position for wireless charging by the wireless charging base, not activating the charging coil.

17. The computer program product as in claim 16, wherein performing the prediction operation includes:
  generate a time series of the state of motion of the device; and
  use a machine learning engine to classify the time series as indicating the device as either (i) about to be placed into a position for wireless charging by the wireless charging base, or (ii) not about to be placed into a position for wireless charging by the wireless charging.

18. The computer program product as in claim 17, wherein the machine learning engine includes a dynamic time-warp algorithm which classifies the time series of the state of motion of the device as either (i) about to be placed into a position for wireless charging by the wireless charging base, or (ii) not about to be placed into a position for wireless charging by the wireless charging.

19. The computer program product as in claim 16, wherein the prediction operation produces a first classification of the device in response to a state of motion for a first user and a second classification of the device in response to the state of motion for a second user.

20. An electronic apparatus, the electronic apparatus comprising:
  memory; and
  controlling circuitry of a wireless charging base having a charging coil configured to charge devices when the devices are within a threshold distance from the wireless charging base, the controlling circuitry being coupled to the memory, the controlling circuitry being configured to:
    receive an indication that a device is present and is in a state of motion;
    in response to the indication that the device is present, perform a prediction operation based on the state of motion of the device to produce a classification of the device as either (i) about to be placed into a position for wireless charging by the wireless charging base, or (ii) not about to be placed into a position for wireless charging by the wireless charging base;
    in response to the classification of the device as being about to be placed into a position for wireless charging by the wireless charging base, activate the charging coil prior to the device being placed within a charging range of the wireless charging base to charge the device; and
    in response to the prediction operation producing the classification of the device as being not about to be placed into a position for wireless charging by the wireless charging base, not activate the charging coil.

* * * * *